(12) United States Patent
Hamlin et al.

(10) Patent No.: US 10,592,597 B2
(45) Date of Patent: Mar. 17, 2020

(54) SMART DEFAULTS BASED ON PREVIOUS SETTINGS FOR PRESENTATION SLIDES

(71) Applicant: salesforce.com, inc., San Francisco, CA (US)

(72) Inventors: Drew Hamlin, San Francisco, CA (US); Andrew Chung, San Francisco, CA (US); William Joseph Flynn, III, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 275 days.

(21) Appl. No.: 15/637,077

(22) Filed: Jun. 29, 2017

(65) Prior Publication Data
US 2019/0005010 A1   Jan. 3, 2019

(51) Int. Cl.
*G06F 17/24* (2006.01)
*G06F 17/21* (2006.01)
*G09B 5/02* (2006.01)

(52) U.S. Cl.
CPC ............ *G06F 17/24* (2013.01); *G06F 17/212* (2013.01); *G06F 17/248* (2013.01); *G09B 5/02* (2013.01)

(58) Field of Classification Search
CPC ....... G06F 17/24; G06F 17/212; G06F 17/248
USPC ...................................................... 715/732
See application file for complete search history.

(56) References Cited

U.S. PATENT DOCUMENTS

| 5,917,480 | A  | * | 6/1999 | Tafoya | ...................... G06T 1/00 715/732 |
| 6,556,217 | B1 | * | 4/2003 | Makipaa | ............. G06F 16/9577 345/667 |
| 6,986,103 | B1 | * | 1/2006 | Beezer | .................. G06F 17/211 715/200 |
| 2011/0043831 | A1 | * | 2/2011 | Sprague | ................ G06F 3/1219 358/1.2 |

OTHER PUBLICATIONS

"Controlling How Text Fits in Text Frames and Text Boxes"; SourceDaddy.com; <https://sourcedaddy.com/ms-powerpoint/controlling-how-text-fits-in-text-frames-and-text-boxes.html>; 2013 (Year: 2013).*
Presentation Mode in Evernote (https://www.youtube.com/watch?v-RImpdq3wmX8), Published on May 14, 2014.

* cited by examiner

*Primary Examiner* — Stephen S Hong
*Assistant Examiner* — Broderick C Anderson
(74) *Attorney, Agent, or Firm* — Sterne, Kessler, Goldstein & Fox P.L.L.C.

(57) ABSTRACT

Described herein are system, method, and computer program product embodiments providing color theme maintenance for presentations. An embodiment operates by receiving original content for placement on a first slide of a presentation. Additional content for placement on the first slide is received and it is determined that the original content and the additional content exceeds a content-threshold of the first slide. A second slide is created using a format of the first slide based upon the determining. The additional content and at least a portion of the original content is moved onto the second slide upon a completion of the creating.

20 Claims, 4 Drawing Sheets

SMART DEFAULTS BASED ON PREVIOUS SETTINGS FOR PRESENTATION SLIDES

CROSS REFERENCE TO RELATED APPLICATIONS

This application is related to U.S. patent application Ser. No. 15/637,729, filed Jun. 29, 2017, entitled "Presentation Collaboration With Various Electronic Devices,", U.S. patent application Ser. No. 15/637,717, filed Jun. 29, 2017, entitled "Automatic Layout Engine,", U.S. patent application Ser. No. 15/637,762, filed Jun. 29, 2017, entitled "Permission Management of Cloud Based Applications,", and U.S. patent application Ser. No. 15/637,096, filed Jun. 29, 2017, entitled "Color Theme Maintenance For Presentations," all of which are hereby incorporated by reference in its entirety.

BACKGROUND

When putting together slides for a presentation, a lot of time must often be spent by a user to configure and adjust the visual appearance of each slide, trying to ensure the visual appearance of the slides are consistent. However when the user changes the format or visual appearance of one slide, the user must then manually go through to make sure the other sides reflect similar changes and that the change did not disrupt the visual consistency of the presentation. This is also an issue when a user adds more content to a slide than can be displayed on the slide. The user must then manually decide which content goes on which slide and ensure that both slides have the same format. This time spent by the user to manually configure, adjust, and maintain the visual appearance of slides both takes away from time the user could use to further develop the actual content of the slides and does not ensure consistency amongst the slide because the slides are still susceptible to poor design practices.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for smart defaults based on previous settings for presentation slides.

Figure 1:
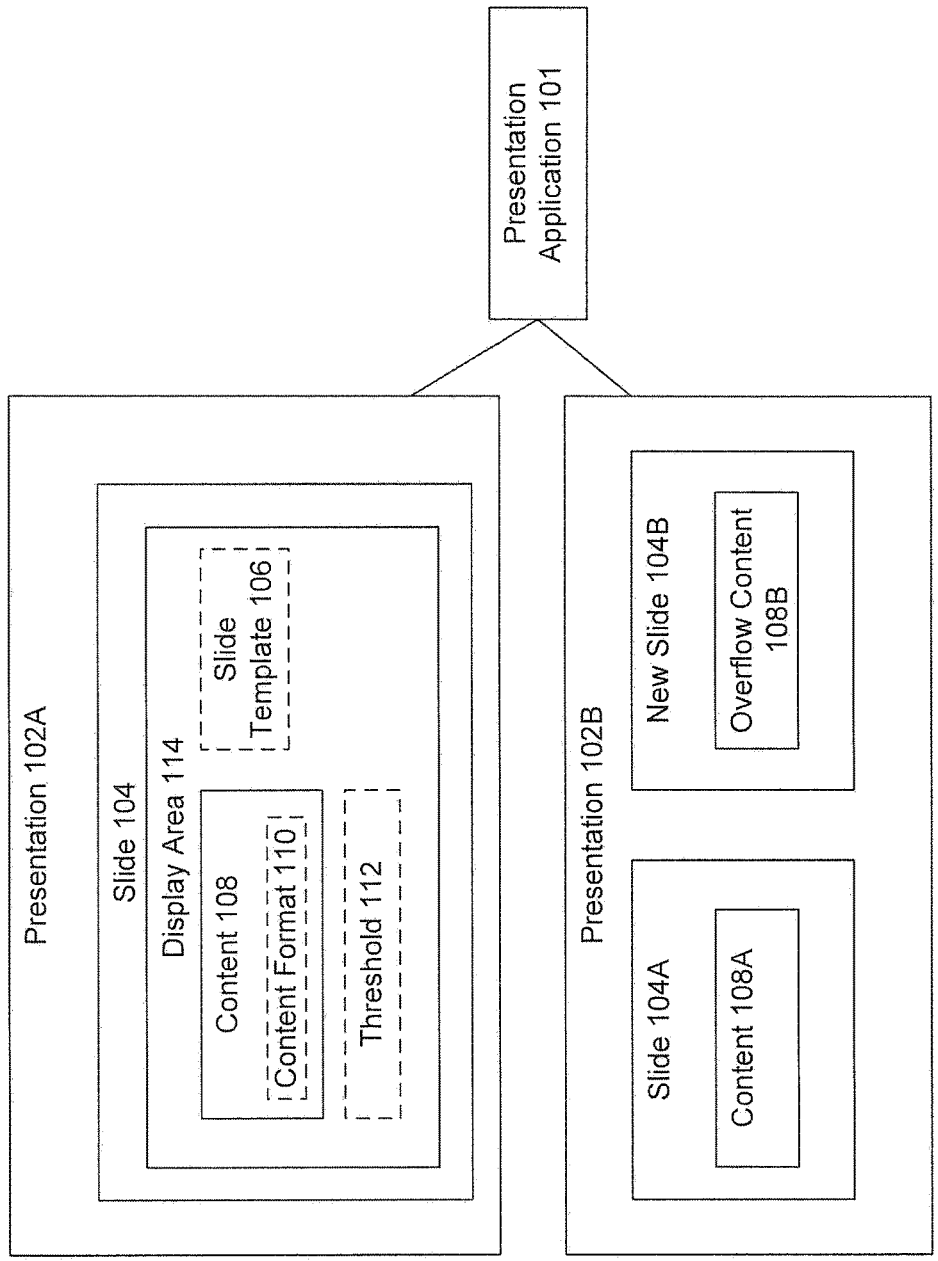
FIG. 1 is a block diagram showing example operations for smart defaults based on previous settings for presentation slides, according to some embodiments.

FIG. 1 is a block diagram 100 showing example operations for smart defaults based on previous settings for presentation slides, according to some embodiments. Presentation 102 may be created using presentation application 101 that enables users to create one or more slides 104 for a presentation 102. Presentation application 101 may be a web-based, cloud-based, or local application, app, program, or other software accessible to one or more users to design, modify, or view slides 104 of presentation 102.

Presentation 102 may include any group of one or more slides 104. In an embodiment, presentation 102 may include slides 104 that are arranged within a particular file or instance of application 101. In an embodiment, presentation 102 may include slides 104 that pertain to a particular subject or project (as may be determined by a content creator or other user). The users may create or format the slides using application 101 or select another slide template 106 with a pre-configured format (which may be adjustable by the user).

Slides 104 may be a visual interface on which users may add, configure, remove, or modify different visual or interface elements or content 108. Content 108 may include alpha-numeric text, images, or other multimedia (such as video or audio files) and other visual elements such as website links.

In an embodiment, a user may select a content format 110 corresponding to different types of content 108 on a slide 104. Content format 110 may include such options as font style, font color, font size, spacing, the size of an image, alignment of different pieces of content 108 within slide 104, a style of content (e.g., text block or list), and other parameters. In an embodiment, content format 110 may include a general formatting of the content such as writing the content as a text block or a numeric or bulleted list.

In an embodiment, slide template 106 may include one or more content format parameters 110 in that the selected values of the parameters of template 110 are applied to all content 108 across multiple slides 104 of presentation 102 (as default or static parameters). In an embodiment, the difference between the parameters of content format 110 and the parameters of slide template 106 may be that content format parameters 110 may be slide or content-specific selections while slide template parameters 106 may apply across all or multiple slides as a default option. In an embodiment, one or more template parameters 106 may be individually configured by a user on a per-slide or per-content basis. For example, a default font may be selected as a slide template parameter 106; however the content format 110 for a particular slide may include a different font selection for that particular slide (or a portion thereof).

In an embodiment, application 101 may monitor presentation 102 as a user is dragging, dropping, modifying, adding, and/or removing content 108 from one or more slides 104. In an embodiment, application 101 may monitor one or more slides 104 for when content 108 exceeds or drops below a threshold 112. Threshold 112 may indicate a threshold for how much content 108A may be included on slide 104 based on the current slide template 106 and/or content format 110.

Threshold 112 may be an indication of how much content is visible or readable in a given display area 114 of a slide 104. In an embodiment, a portion of the screen space of a slide 104 may be allocated to a background image, gutter area, or other border. Thus the display area 114 of a particular slide 104A may be less than the entire area available within a slide 104. In an embodiment, threshold 112 may indicate how much content 108 with various display settings (e.g., content format 110 and/or slide template 106 settings) can be displayed within display area 114 without needing to concatenate the text, images, or other content 108 or adjust the display settings.

When application 101 determines that threshold 112 has been exceeded, application 101 may automatically (e.g., without user request or intervention or request) divide the content 108 into two slides 104A and 104B. For example, application 101 may create a new slide 104B using slide template 106 and/or content format 110. Then, for example, upon the creation of new slide 104B, application 101 may divide content 108 into two portions, content 108A and overflow content 108B. All of this may occur without user intervention and while a user is continuing to add or modify the text or other content 108 of the slides 104. The new content may be included as overflow content 108B.

In an embodiment, overflow content 108B may include more content than just the content that exceeds threshold 112. For example, if a user enters one too many words within content 108, rather than simply moving the extra word to new slide 104B, application 101 may take a larger chunk of content 108 and move it as overflow content 108B. In an embodiment, presentation application 101 may try and even out content 108A and overflow content 108B between the slides 104A and 104B onto which the content is divided. Then as a user adds or removes content 108A, 108B from the slides 104A, 104B application 101 may continually adjust and readjust content 108 between the slides 104A, 104B (including removing new slide 104B if content 108 falls below threshold 112). If content 108B exceeds threshold 112, then content 108A and 108B may then be divided or distributed across three slides (not shown).

In an embodiment, application 101 may monitor user input as a user is adding, removing, or otherwise modifying the content 108A, and only when a particular event indicating a user has completed or paused data entry or modification actions may application 101 re-format and re-configure content 108A across two or more slides 104A. For example, once a pause of two seconds or another time period is detected, application 101 may divide content 108 into content 108A and 108B across slides 104A and 104B.

Figure 2:
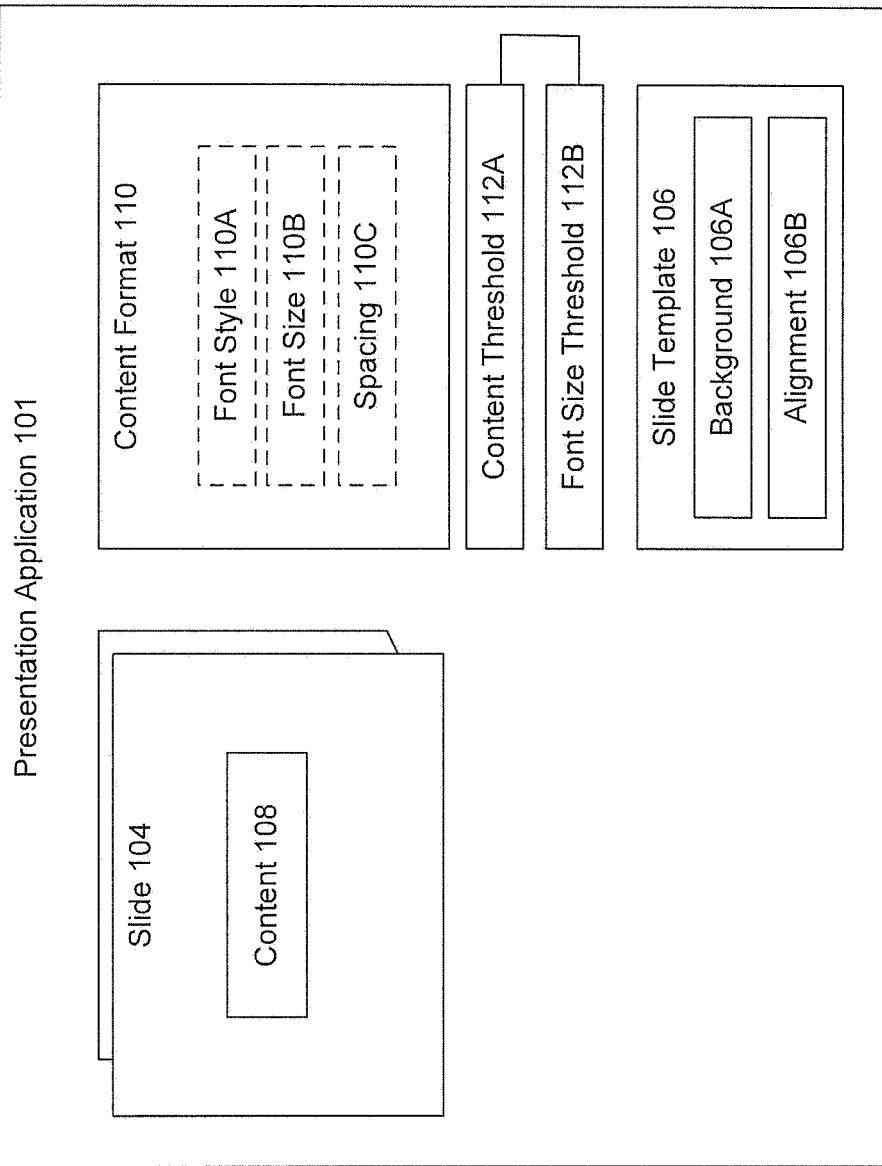
FIG. 2 is a block diagram showing example operations for smart defaults based on previous settings for presentation slides, according to some embodiments.

FIG. 2 is a block diagram 200 showing example operations for smart defaults based on previous settings for presentation slides, according to some embodiments. Presentation application 101 may monitor slide 104 as content 108 is added and removed by one or more users. When content 108 of slide 104 exceeds a content threshold 112A, application 101 may perform actions (without user intervention or request) and upon determining that threshold 112A has been exceeded to ensure that all of content 108 added by a user is properly or visibly displayed across one or more slides of a presentation.

In an embodiment, content 108 may be formatted according to parameters 110A-110C of content format 110. Several example content parameters 110A-C are shown in the example of FIG. 2, however in other embodiments other or different parameters may be used. Font style 110A may indicate which font style or typescript is used for alphanumeric characters of one or more pieces of content 108 of a slide 104. Example font styles include Times New Roman, Calibri, and Cambia. In an embodiment, font style 110A may include an indication as to whether the selected font is underlined, bolded, italicized, includes a border, a color of the font or any other special effects or characteristics which may be applied to the font.

Font size 110B may indicate a size of the font. In an embodiment, font size 110B may indicate a selected font size (e.g., based on a default size, or user selection). Or, for example, font size 110B may be an indicator of how much screen area a particular font consumes. For example, a font style of "Wide Latin" at a character size 10 may take up more screen or display area than the font style Narrow Latin or Times New Roman at the same character size 10. As such, font size 110B may indicate the relative or absolute sizes of the font styles as an indicator of how much screen area particular characters of the font style consume.

Space 110C may indicate an amount of spacing between two lines of text or other elements within content 108. For example, if content includes two images and a text block, spacing 1100 may indicate how much space exists between the three content elements. In an embodiment, spacing 110C may indicate an amount of spacing between characters of the selected font style and indicate how much space exists between separate characters or separate lines of characters/text. In other embodiments, content format 110 may include configurable parameters relative to other types of content (e.g., such as images) such as image size, image border, etc. In an embodiment, different types of content may include different content format parameters 110 configured on a per-slide or per-presentation (e.g., as a portion of slide template 106) basis.

Content threshold 112A may indicate a maximum amount of content 108 that may fit within slide 104 with the given content format 110. When content threshold 112A is exceeded, application 101 may adjust content 108 and/or content format 110 such that the content 108 fits within content threshold 112A. As discussed above with respect to FIG. 1, content 108 may be divided across two or more slides 104.

In an embodiment, prior to dividing content 108 across two or more slides, application 101 may automatically adjust content format 110 parameters and settings so that content 108 which exceeded content threshold 112A at a first content format 110 is reduced or reformatted to fit within content area 112A using a second content format 112. Application 101 may achieve this, for example, by reducing the font size 110, changing the font style 110A (to one that takes up less display area or space) and/or adjusting the spacing 110C or other content format parameters 110. The selection of new, smaller font sizes or font styles new font enables more text characters to fit on the first slide 104 than the original font selections. Application 101 may then reformat the existing content 108 using the new selections or parameters.

In an embodiment, a font size threshold 112B may be an example of a lower bound of how small a selected font style 110A or font size 110B may be selected in reducing the size of text in response to content 108 exceeding content threshold 112. Content threshold 112 may indicate upper and/or lower bounds for various content format parameters 110. For example, as a user is typing and adding more and more textual content 108 to slide 104, application may continually adjust content format 110 (e.g., such as by reducing font size 110B) up until a font size threshold 112B has been reached. In an embodiment, font size threshold 112B may also indicate spacing and font style thresholds as well.

In an embodiment, the font size 110B and other content parameters 110 may be repeatedly resized or readjusted as the content 108 is modified. For example, as a user adds content 108, the font size 110B may be reduced, then when content 108 exceeds content threshold 112A again, the font size 110B may be reduced again. This process may be repeated as content is added until font size threshold 112B is reached or exceeded.

In an embodiment, there may be multiple content format thresholds 112B. For example, there may be a spacing threshold as well as a font size threshold and a font style threshold. In an embodiment, one or more of the thresholds may be dependent on the values of other thresholds. For example, a first font style 110A may be selected from any of three possible font styles (as indicated by a font style threshold). Then, for example, font size threshold 112B may vary depending on which font style 110A is selected.

Once, font size threshold 112B has been reached or exceeded, application 101 may create a new slide as described above with respect to FIG. 1, and divide content 108 amongst the slides 104. In an embodiment, when a new slide is created, the original, default, or previously larger content format parameters 110 (before the automatic adjustments which may have been performed to reduce content 108 below content threshold 112A) may be used for both slides 104.

This process may be continued as additional content 108 is added to the two-related or continuation slides 104. When a content threshold 112A (and font size threshold 112B) has been reached for the two slides, content 108 may then be divided across three slides and so on.

Similarly, application 101 may monitor continuation slides to determine when content 108 is removed from the slides and content 108 falls below content threshold 112A. In an embodiment, when content 108 falls below content threshold 112A, the content may be reduced to fewer slides and the extra slide may be automatically deleted as its content 108 is distributed to any remaining slide(s) 104.

The new slides created within a particular presentation in application 101 may each have an identical slide template 106. Example slide template parameters background 106A and alignment 106B may be shown. Background 106 may indicate a background or gutter image or width that is present across the slides 104. Alignment 106B may indicate how various text elements are aligned relative to each other across slides 104. For example, if a user adds two images or an image and text box to slide 104, how are the two content elements aligned or arranged relative to one another and within slide 104.

In an embodiment, application 101 may adjust parameters of slide template 106 when content 108 exceeds content threshold 112. In an embodiment however, adjusting slide template parameters 106 may require a user interaction or confirmation before being performed.

Figure 3:
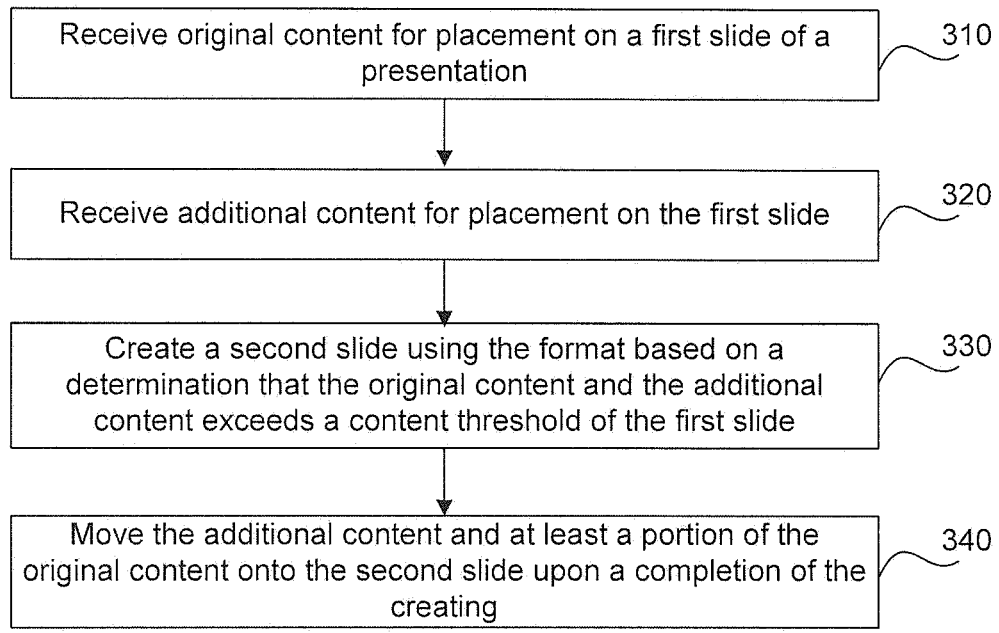
FIG. 3 is a flowchart illustrating a process for smart defaults based on previous settings for presentation slides, according to some embodiments.

FIG. 3 is a flowchart illustrating a process 300 for smart defaults based on previous settings for presentation slides, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 310, original content for placement on a first slide of a presentation is received. For example, presentation application 101 may receive content 108 for inclusion within display area 114 of slide 104. The content 108 may be displayed and formatted in accordance with content format 110 and slide template 106, which may indicate a text style, spacing, or size of content.

At 320, additional content for placement on the first slide is received. For example, presentation application 101 may receive additional pieces of content 108 such as images or text for display within slide 104.

At 330, a second slide is created using the format based on a determination that the original content and the additional content exceeds a content-threshold of the first slide. For example, application 101 may determine that content 108 exceeds threshold 112 (e.g., content threshold 112A) of slide 104. In an embodiment, threshold 112 may be uniform across all slides 104 of a presentation 102, or may vary depending on which types of content are included on any particular slide 104. Presentation application 101 may create a new or second slide 104B using the content format 110 and slide template 106 of slide 104 (e.g., of the first slide). This may enable application 101 to maintain a consistency between different, but related slides 104 of a presentation 102, and particular continuation slides 104A, 104B between which content 108 is divided.

In an embodiment, the content-threshold may vary on a per-device or per-screen-size basis. Thus, for example, while on a first device with a larger screen size (and a larger content threshold 112A), content may be spread across fewer slides than when the same slides are viewed on a second device with a smaller screen size (and thus a smaller content threshold 112A). Or, for example, a portion of the content may be hidden on a smaller screen of another device. For example, a particular slide may include a picture and text or a caption. Then, for example, while a laptop may see both the picture and the caption, the same slide viewed on a mobile device may only show the picture to be immediately visible. Then, for example, a user may click on the picture or perform another action to see the caption. In an embodiment, the slide may include an indicator (such as a '+' sign) indicating that a portion of the content has been hidden or reduced based on the screen size.

In another embodiment, the slides may include the same content regardless of the screen size of the device upon which they are being viewed, accessed, or edited. In another embodiment, a user may select a particular device or screen size for which the user wants the slides optimized, and the content threshold 112A may be adjusted accordingly to optimize viewing for the selected screen size or device.

At 340, the additional content and at least a portion of the original content are moved onto the second slide upon a completion of the creating. For example, application 101 may divide content 108 between slide 104A as content 108A and slide 104B as overflow content 108B. The content of both slides 108A and 108B may be displayed (e.g., in the respective slides) using the same visual format (e.g., font, colors, spacing, sizing, etc.)

In an embodiment, content 108 may be divided as evenly as possible to avoid situations in which content 108A and 108B is extremely uneven between the slides 104A, 108B (e.g., beyond a disparity threshold). For example, dividing content 108 according to a disparity threshold between continuation slides (slides in which content 104 has been divided) may avoid situations in which a first or original slide has most of the content and is full while the second slide 104B has only one or two words or line.

In an embodiment, disparity threshold may be expressed as a relative value such as 60:40 whereby the first or original slide contains around 60% of the divided content and the second slide must contain at least 40% of the content. Or, for example, the first slide can contain no more than 60% of the content and the second slide contains the rest of the content. This disparity threshold may be maintained when the content 108 is extended to three or more continuation slides as well.

Figure 4:
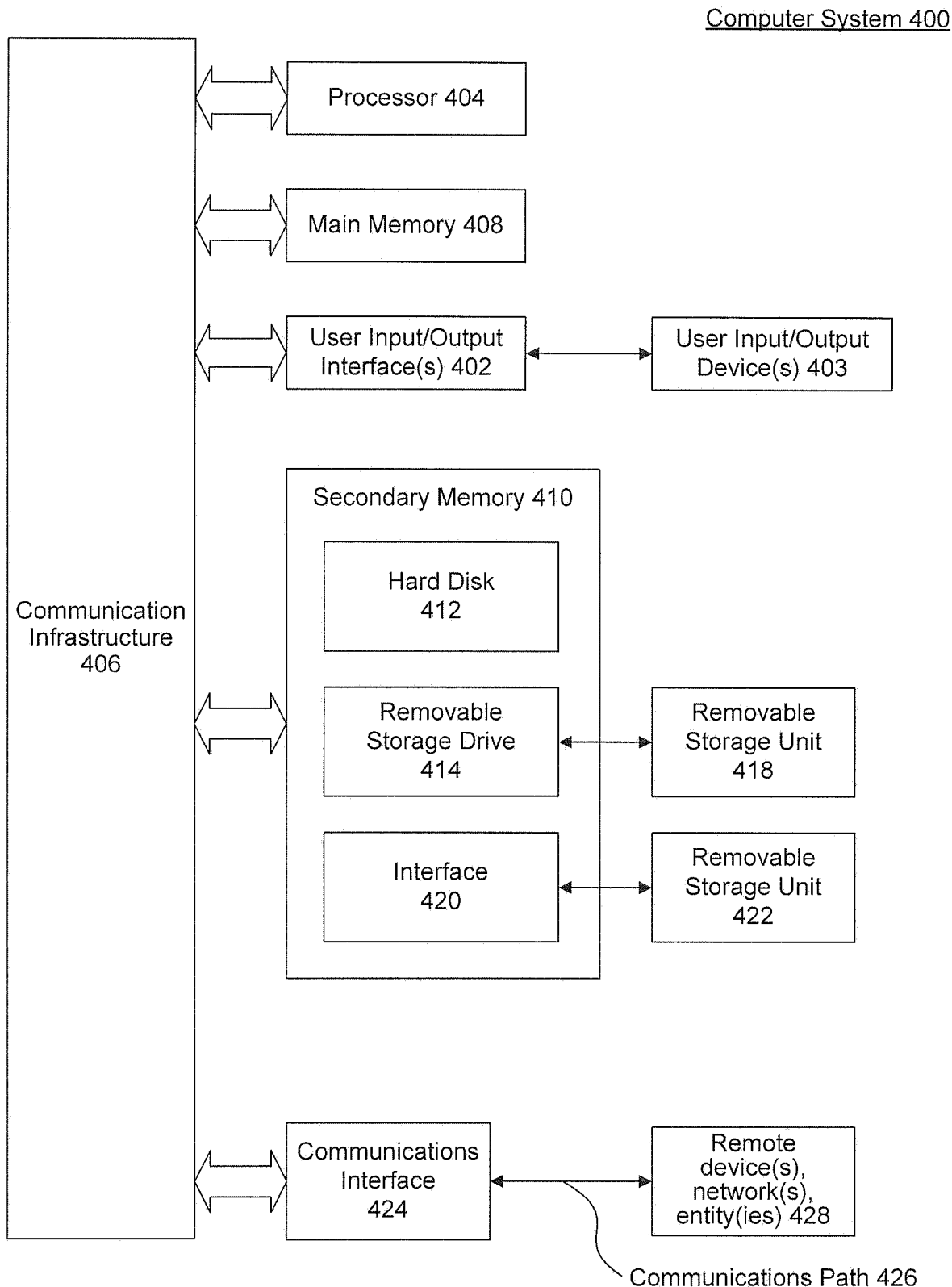
FIG. 4 is an example computer system useful for implementing various embodiments.

Various embodiments can be implemented, for example, using one or more computer systems, such as computer system 400 shown in FIG. 4. Computer system 400 can be used, for example, to implement the systems described above with respect to the figures, and/or the method of FIG. 3. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for creating a presentation, comprising:
receiving original content for placement on a first slide of a presentation, wherein the first slide displays the content in accordance with a format of the content based on an original font style;
receiving additional content for placement on the first slide based on the original font style;
determining that the original content and the additional content exceeds a content-threshold of the first slide;
selecting, by a processor, one of a new smaller-sized font style than the original font style;
automatically reformatting, by the processor and responsive to the selecting, the original content and the additional content using the new smaller-sized font style, wherein upon a determination that the original content and the additional content in the new smaller-sized font style exceeds the content threshold, creating a second slide; and
moving the additional content and at least a portion of the original content onto the second slide upon a completion of the creating, wherein both the additional content and the original content are displayed in the slides using the same format.

2. The method of claim 1, wherein the receiving comprises:
determining, based on the format, an original font size of an original font style of the original content on the first slide;
selecting one of a new smaller-sized font style than the original font style; and
automatically reformatting the original content using the smaller-sized font style instead of the original font style, wherein the reformatted content is less than the content-threshold.

3. The method of claim 1, wherein the new font style enables more text characters to fit on the first slide than the original font style.

4. The method of claim 1, further comprising:
repeatedly reducing a font size of the smaller-sized font style until a font-size threshold is exceeded, wherein upon a determination that the font-size threshold is exceeded and the content-threshold is exceeded, the creating is executed.

5. The method of claim 4, wherein the first slide and the second slide both use the original font size and the original font.

6. The method of claim 1, wherein the format of the content is a list format, and wherein the creating comprises creating the second slide using the list format.

7. The method of claim 1, wherein the format of the content is a text block format, and wherein the creating comprises creating the second slide using the text block format.

8. The method of claim 1, further comprising:
automatically reformatting, by the processor, content on the first slide and the second slide based one or more subsequent user actions after the moving, the subsequent user actions including at least one of adding or removing content from either the first slide or the second slide.

9. The method of claim 8, wherein the automatically reformatting content on the first slide and the second slide comprises:
determining that at least a portion of the additional content is removed;
reducing a size of a font of the format;
automatically reformatting the original content and whatever portion of the additional content remains based on the reduced size of the font;
determining that the reformatted content is less than the content-threshold;
automatically moving reformatted content to the first slide; and
removing the second slide.

10. The method of claim 8, automatically reformatting content on the first slide and the second slide comprises:
automatically changing, by the processor, one of the font style or a font size for the content on both the first slide and the second slide.

11. A system, comprising:
a memory; and
at least one processor coupled to the memory and configured to:
receive original content for placement on a first slide of a presentation, wherein the first slide displays the content in accordance with a format of the content based on an original font style;
receive additional content for placement on the first slide based on the original font style;
determine that the original content and the additional content exceeds a content-threshold of the first slide;
select, by the at least one processor, one of a new smaller-sized font style than the original font style;
automatically reformat, by the at least one processor and responsive to the selecting, the original content and the additional content using the new smaller-sized font style, wherein upon a determination that the original content and the additional content in the new smaller-sized font style exceeds the content threshold, creating a second slide; and
move the additional content and at least a portion of the original content onto the second slide upon a completion of the creating, wherein both the additional content and the original content are displayed in the slides using the same format.

12. The system of claim 11, wherein the processor configured to receive is configured to:
determine, based on the format, an original font size of an original font of the original content on the first slide;
select one of a new smaller-sized font style than the original font style; and
automatically reformat the original content using the smaller-sized font style instead of the original font style, wherein the reformatted content is less than the content-threshold.

13. The system of claim 11, wherein the new font style enables more text characters to fit on the first slide than the original font style.

14. The system of claim 11, wherein the processor further configured to:
repeatedly reduce a font size of the smaller-sized font style until a font-size threshold is exceeded, wherein upon a determination that the font-size threshold is exceeded and the content-threshold is exceeded, the creating is executed.

15. The system of claim 14, wherein the first slide and the second slide both use the original font size and the original font.

16. The system of claim 11, wherein the format of the content is a list format, and wherein the creating comprises creating the second slide using the list format.

17. The system of claim 11, wherein the format of the content is a text block format, and wherein the creating comprises creating the second slide using the text block format.

18. A non-transitory computer-readable device having instructions stored on a memory thereon that when executed by at least one processor of the device, causes the at least one processor to perform operations comprising:
- receiving original content for placement on a first slide of a presentation, wherein the first slide displays the content in accordance with a format of the content based on an original font style;
- receiving additional content for placement on the first slide based on the original font style;
- determining that the original content and the additional content exceeds a content-threshold of the first slide;
- selecting, by the at least one processor, one of a new smaller-sized font style than the original font style;
- automatically reformatting, by the at least one processor and responsive to the selecting, the original content and the additional content using the new smaller-sized font style, wherein upon a determination that the original content and the additional content in the new smaller-sized font style exceeds the content threshold, creating a second slide; and
- moving the additional content and at least a portion of the original content onto the second slide upon a completion of the creating, wherein both the additional content and the original content are displayed in the slides using the same format.

19. The device of claim 18, wherein the operations further comprise:
- repeatedly reducing a font size of the smaller-sized font style until a font-size threshold is exceeded, wherein upon a determination that the font-size threshold is exceeded and the content-threshold is exceeded, the creating is executed.

20. The device of claim 19, wherein the first slide and the second slide both use the original font size and the original font.

* * * * *